May 12, 1959  G. D. SWAN  2,886,481
SCREEN PANEL AND METHOD OF MAKING THE SAME
Filed July 15, 1955
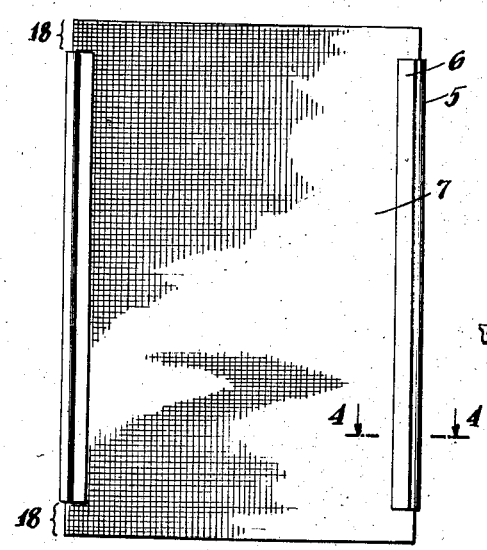
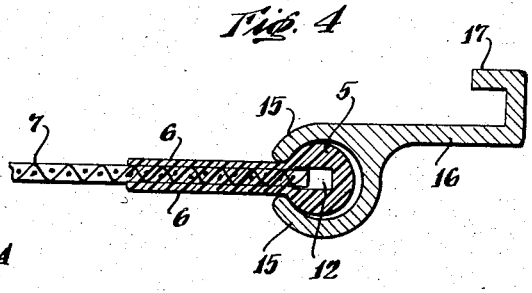
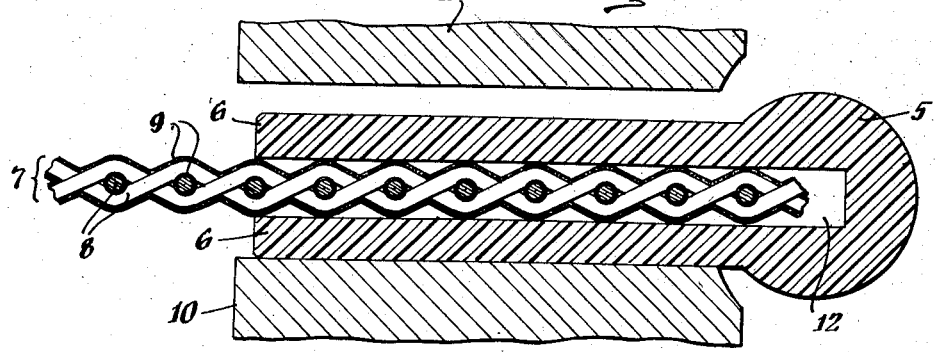
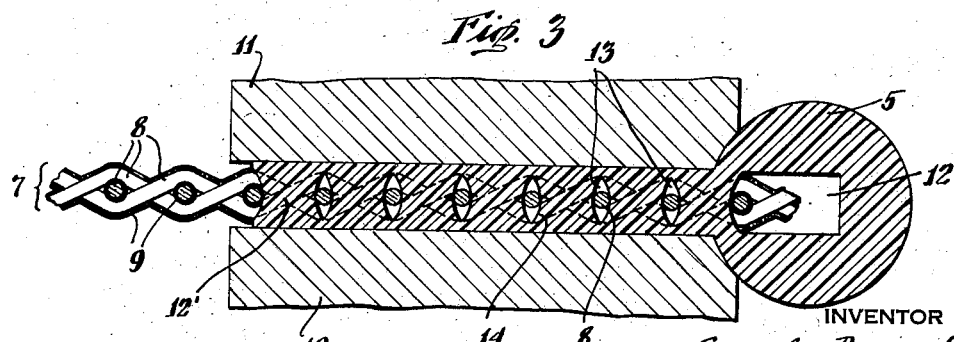
INVENTOR
George Dewey Swan
BY
Kane, Dalsimer & Kane
ATTORNEYS

United States Patent Office 2,886,481
Patented May 12, 1959

2,886,481

SCREEN PANEL AND METHOD OF MAKING THE SAME

George Dewey Swan, Cos Cob, Conn.

Application July 15, 1955, Serial No. 522,355

4 Claims. (Cl. 154—116)

This invention relates to a structurally and functionally improved screen panel and a method of making the same.

In its most specific aspect, the present invention aims to provide a panel construction of screening usable, for example, in windows, doors, enclosures such as porches, etc. Where so used, a structure is furnished which will present an extremely neat appearance and which may readily be mounted and dismounted. When mounted, it will effectively prevent the passage of insects.

A further object is that of teaching a method of manufacturing a panel of this type which method may be practiced by relatively unskilled labor to economically furnish desired panels of any required length.

With these and other objects in mind, reference is had to the attached sheet of drawings illustrating one practical embodiment of the invention and in which:

Fig. 1 is a front elevation of a completed panel;

Fig. 2 is a sectional view taken through a spline or beading and the adjacent zone of a screen panel prior to the coupling of these elements;

Fig. 3 is a similar view showing the screening and spline as they are permanently united; and Fig. 4 is a transverse sectional view taken along the line 4—4 of Fig. 1 and also showing in section a retaining member which will suitably mount the panel.

Referring primarily to Fig. 2, the numeral 5 indicates the head or bead portion of a spline member which is generally U-shaped in cross-section. Its legs 6 are separated a distance such that a fabric 7 may be introduced between the same to either abut the base of the member or to be slightly spaced from such base. The beading and its legs are conveniently integral and are formed of plastic preferably of the thermal type. Also as shown, while the spline element preferably includes a pair of legs, only one leg might in certain instances be employed.

The fabric 7 is—according to a preferred embodiment—formed of fiberglass which will embrace threads 8. These are arranged in any desired manner with respect to each other to furnish a screen material of suitable size and mesh. Preferably, the threads 8 will be coated with neoprene as indicated at 9. Such a coating may also be used to advantage if the threads 8 be not formed of fiberglass but rather embrace strands of metal such as aluminum, copper, etc. Regardless of the material providing the screening, the latter may simply be cut along a desired line and need not include a finished edge portion; this being provided by the spline member.

To bond the spline and panel to one another so that they may not be subsequently separated, it is preferred according to the present teachings to employ an apparatus popularly known as an "electronic sewing machine." This will include, as in Figs. 2 and 3, a suitable support and a bar or foot portion cooperable with that support. These elements have been somewhat diagrammatically shown with the former indicated by the numeral 10 and the latter by the numeral 11. The spline with the edge of the fabric received between its legs may be supported by the element 10. Thereupon element 11 is brought into suitable relationship with respect to the first element and the spline supported thereon. Now by the establishment of a proper electrical field, heat will be generated in the zone defined by the fabric and the inner surfaces of legs 6. This heat will be sufficiently high to render the inner faces of legs 6 and the coating 9 plastic. It will not be so high as to detrimentally affect the threads 8 be they formed of fiberglass or metal.

Simultaneously with the generation of this heat field or zone, pressure will be applied to the outer faces of legs 6 by elements 10 and 11. As the coating 9 is rendered plastic, the individual elements providing the threads 8 will have a tendency to separate if those threads be formed of fiberglass. However, simultaneously with the disrupting or plasticizing of coating 9, this coating and the threads will merge into the body of the plastic providing the spline member. This has been shown in Fig. 3. Therefore, the components of the threads will not tend to unravel.

As shown in this latter view, the identity of the legs 6 under the foregoing procedure is merged into one component layer of plastic within which the edge zone of the panel 7 is present. Assuming that the elements 11 and 10 do not extend through an area including the bead portion 5 of the spline member, then an opening or bore 12 will exist within that beading and into which cavity, the edge of panel 7 may extend. By providing for such a structure, bead 5 will embody higher resiliency and flexibility than would otherwise be the case and this is desirable in a panel structure. In effect, cavity portions 13 may extend above and below the threads 8 within the mass of plastic. Of course, if adequate pressures and heat are employed, then these cavities will not come into existence. In any event, what might be termed post portions 14 will extend through the interstices of the fabric layer to thus key the spline member against separating tendencies from the body of the panel. As will be appreciated, if cavities on the order of 13 do come into being no detrimental unraveling tendencies will exist on the part of threads 8, in that the opposite side faces of the same will be bonded into the surfaces of the plastic layer.

The spline which thus, in effect, forms an integral part of the panel cooperates with a receiving and retaining member. As shown especially in Fig. 4, the latter may include a pair of jaws or arms 15 separated a distance such that at their free ends they will not permit of the passage of bead 5. These arms 15 may be integral with each other and be continued in the form of a shank 16 terminating in a hooked outer edge portion 17. The latter conveniently extends in face contact with and around the edge of a structural strip or channel member (not shown). In this manner, the unit is prevented from shifting. The base portions of arms 15 are separated as in Fig. 4 a distance greater than the diameter of bead 5. Therefore, the latter may freely slide in a direction parallel to the axis of the bore defined by the arms 15.

As shown particularly in Fig. 1, spline members may be applied merely to opposite side edges of a panel 7. Of course, a third spline member could be utilized. This, however, is unnecessary and in many respects undesirable. The panel conveniently extends beyond the ends of the two spline elements for a certain zone generally indicated at 18. These end zones or projecting portions may be suitably disposed within grooves, channels or other receiving cavities forming a part of the enclosure or frame within which the retaining and receiving members 15—17 are included. In this manner, a structure preventing ingress of insects is furnished.

It is found that after the splines are associated with the panel as aforedescribed and are thereupon disposed with their beads 5 within the channels defined between arms 15, that by suitable adjusting provision the receiving and retaining members may be moved in opposite directions away from each other and through a limited zone. Under these circumstances, and as indicated in Fig. 4, the bead 5 will in effect wedge between the arms 15 with a resultant frictional engagement between the parts such that there will be no danger of the panel shifting with respect to the retaining member. The side tension exerted under these circumstances results in the panel material being drawn taut free from any bulges or wrinkles. No end tension is necessary to maintain the neat and proper condition of the mounted panel. When it is desired to dismount that panel, the retaining members 15—17 may be shifted towards its opposed member. Thereupon, by exerting an end pull on the panel, bead 5 will slide through the channels defined by arms 15 so that the panel may be completely removed from the retaining members.

Thus, among others, the several objects of the invention as specifically aforenoted are achieved. Obviously numerous changes in construction might be resorted to and the steps of the method might be varied without departing from the spirit of the invention as defined by the claims.

I claim:

1. A method of making a screen panel which includes employing a spline element and a fabric layer presenting interstices formed by threads embracing a number of components, coating said threads—to prevent an unraveling of their components—with a layer of material rendered plastic by the action of heat, disposing an edge zone of such fabric adjacent a surface of said element and exerting heat and pressure to cause the coating of said threads to be rendered plastic and to adhere to the material of said element and thus bond the latter to the edge zone of such fabric while maintaining the coating layer in its initially applied state to threads beyond the zone of said spline element.

2. A method of making a screen panel which includes employing a U-shaped spline element of plastic material and which spline has a base in the form of a hollow bead, introducing the edge zone of a layer of fabric between the legs of such spline to a point short of the base of said U, subjecting the adjacent spline and fabric surfaces to the action of heat, pressing the legs of such element into engagement with the fabric interposed therebetween to cause material to pass from such element through the interstices of the fabric and thus bond the latter to said spline element and limiting the action of the heat and pressure to a zone short of said bead whereby the latter will include an unclosed bore portion maintaining resiliency in such bead.

3. A method of making a screen panel which includes employing a fabric formed of fiberglass threads arranged to provide interstices in the fabric, coating those threads with a layer of plastic material, providing a plastic spline element substantially U-shaped in cross-section with the base of the same enlarged to furnish a hollow bead, arranging the edge zone of said fabric between the arms of said U to extend to a point short of the base of the same to thereby provide a cavity between that edge and base, subjecting the parts to heat such that the coating of the threads and the adjacent arm surface are rendered plastic and applying pressure to the parts such that the plastic materials are merged and integrally bonded.

4. In a method as defined in claim 1, the surface material of the element being also rendered plastic during said exertion of heat, such surface and coating material merging into a substantially integral part during the exertion of pressure and the components of the threads remaining bonded to the spline upon such part cooling.

References Cited in the file of this patent

UNITED STATES PATENTS

| Number | Name | Date |
|---|---|---|
| 265,302 | Brigham | Oct. 3, 1882 |
| 1,580,071 | Naramore | Apr. 6, 1926 |
| 1,977,165 | Williams | Oct. 16, 1934 |
| 2,368,053 | Van Voorhees | Jan. 23, 1945 |
| 2,381,542 | Hyatt et al. | Aug. 7, 1945 |
| 2,565,219 | Gardiner et al. | Aug. 21, 1951 |
| 2,582,456 | Poux | Jan. 15, 1952 |